May 1, 1956 W. J. MORDARSKI ET AL 2,743,892

SHOCK MOUNT

Filed April 3, 1953

INVENTORS
Walter J. Mordarski
and William H. Spencer
BY
Rockwell & Southston
ATTORNEYS United States Patent Office 2,743,892
Patented May 1, 1956

2,743,892

SHOCK MOUNT

Walter J. Mordarski, Meriden, and William H. Spencer, East Haven, Conn., assignors to The Connecticut Hard Rubber Company, New Haven, Conn., a corporation of Connecticut Application April 3, 1953, Serial No. 346,722

2 Claims. (Cl. 248—24)

This invention relates to antivibration or shock mounts, and more particularly to a mount or means for supporting a relatively heavy object such, for example, as a jet engine or a guided missile during transportation thereof.

It sometimes occurs that when heavy objects are transported from place to place the shocks and vibrations to which they are subjected cause damage to parts of the mechanism. This is true, for example, when such objects as engines or other machinery having delicate bearings are transported from place to place by rail or truck. This has resulted in damage to the bearings which might have been avoided if the engine or other mechanism had been mounted on suitable supports which could withstand vibration and shock without placing too high a peak load on the mounted unit.

It is desirable in constructing a support or mount for the described purpose to provide a structure that will absorb a large amount of energy without placing too high a peak load upon the mounted unit and without making the resilient element so soft as to allow excessively large deflections and very low natural frequencies. In the present instance a rubber or rubber-like material is employed between two concentric cylindrical members, one of the members serving as a supporting member and the other serving as the supported member or the member carrying the load. The rubber or other resilient material between these inner and outer members is so shaped that when a load-deflection curve is plotted, the curve will tend to flatten out when a load of a predetermined amount is reached, the deflection increasing rapidly from this point with a small increase of load.

As the energy absorbed by the mount is equal to the load times the deflection, it will be seen that when the load-deflection curve is substantially flat, a large amount of energy is absorbed without placing too great a peak load on the mounted unit.

It will be noted that the lower surface of the rubber portion of the mounting is inclined upwardly from its lower point of connection with the outer member to the lower point of connection with the inner member so that the lower surface of the rubber or rubber-like portion is generally frusto-conical in shape. When the load is placed upon the inner member, for example, the downward force of this load tends to exert a force of compression upon the rubber, the inner member being deflected or being moved downwardly. Thus the rubber is first placed under compression and shear as the lower surface of the rubber portion of the mounting tends to flatten out. As the compression load increases still more, the rubber is placed under tension and shear.

As illustrated, the improved structure comprises an outer cylindrical body or housing in the form of a short section of pipe, for example, formed of rigid material and an inner body of elastic material of rubber or rubber-like substance. This body may be natural rubber, one of the organic synthetic rubbers, or silicone rubber. This body of material is generally in the form of a frustrum of a cone. A considerable area of the outer surface adjacent the lower end of this body is bonded to the supporting cylindrical member, and both the outer and inner surfaces of the body project upwardly, and embedded in the elastic material at the upper portion thereof is a supporting member of bulbous shape which is illustrated as of substantially spherical form. This bulbous member is the load-supporting member and is in turn supported by the elastic material carried by the outer cylindrical member.

One object of the invention is to provide a new and improved resilient mount for supporting a load to prevent shock or vibration damage to the supported load.

Still another object of the invention is to provide a mount for supporting a load which is subject to shock or vibration so that a large amount of energy will be absorbed by the mount itself without placing too great a load upon the supported unit.

A still further object of the invention is to provide a vibration-damping mounting comprising a load-supporting member of spherical or bulbous form embedded in a body of rubber-like or elastic material and bonded thereto, the body of elastic material extending downwardly and outwardly in frusto-conical form and having its outer surface at the lower end thereof bonded to the inner surface of a hollow or cylindrical supporting member.

To these and other ends the invention consists in the novel features and combinations of parts to be hereinafter described and claimed.

Figure 1:
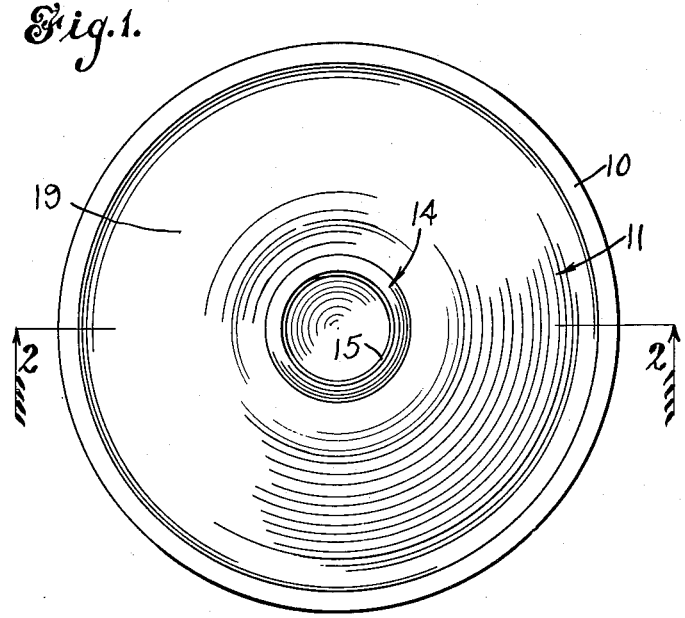
Fig. 1 is a top plan view of a mounting embodying our invention.

To illustrate a preferred embodiment of our invention we have shown in the drawings a vibration-damping mounting comprising an outer member 10 which may be formed of rigid material such as metal, this member being hollow and of cylindrical form, as illustrated.

Figure 2:
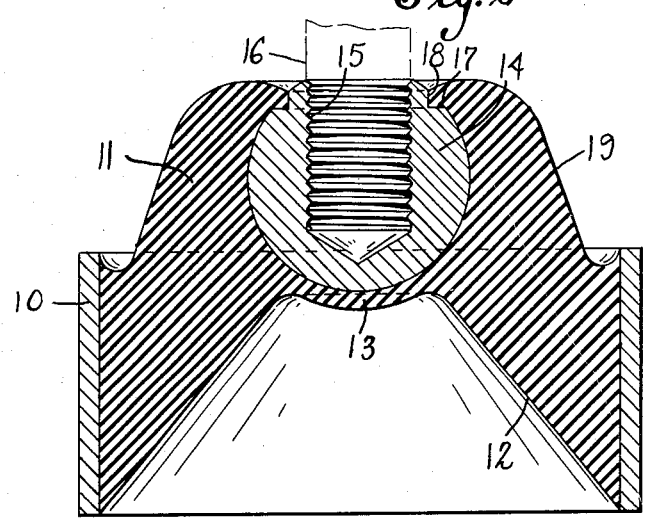
Fig. 2 is a sectional view on line 2—2 of Fig. 1.
Figure 3:
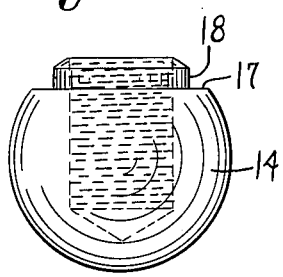
Fig. 3 is a side elevational view of the load-carrying member.

Within the member 10 is a body of elastic material such as rubber, synthetic rubber, or silicone rubber 11 which as shown is of substantially frusto-conical form. As shown in Fig. 2, both inner and outer surfaces project upwardly from their lower edges, the inner surface 12 being of substantially frusto-conical form and projecting upwardly to a point adjacent the level of the upper edge of the outer shell 10 where it is provided with a web portion 13 forming the top of the inner surface.

Embedded within the body of elastic material 11 is a supporting member 14 of bulbous form which, as shown, is substantially spherical in shape. This member may be provided with a centrally disposed screw-threaded opening 15 for the reception of a load-supporting member such as a stem or rod 16. This member 14 is recessed or cut away at its upper portion so as to provide a substantially horizontal area or shoulder 17 and a substantially vertical shoulder 18, and it will be noted that the upper end of this member is substantially flush with the upper surface of the body of elastic material 11.

The outer surface of the body of elastic material slopes upwardly and inwardly, as shown at 19, toward the upper end of the spherical member 14 but does not extend above this member, and at its upper end the elastic material is molded into the recess formed at the top of the member 14 and bonded to the shoulders 17 and 18. It will further be understood that the element 14 will preferably be bonded to the elastic material 11 over its entire surface.

The cutting away of the material to provide the shoulders 17 and 18 and the bonding of the rubber into the recess so formed serves to place the rubber under shear at this point of bond instead of under tension as would be the case if the recess is not provided. With the present construction when a load is placed upon the member 14, the pull downwardly upon the upper portion of the rubber-like body 11 tends to place the material at that point under shear as the body of material surrounding the point of bond will tend to keep its normal position. The provision of the shoulders 17 and 18 also provides increased bonding area at that point.

Moreover, the embedding of the member 14 in the elastic material 11 and the supporting of this member from below by the web 13 will increase the load-carrying quality of the mount. In a mount of this kind there is a high stress area at the lower end of the load-carrying member (in this case the ball 14), and when this member is embedded in the rubber, as shown, and supported from below by the web 13, a greater load can be carried without tear or failure at the bottom of the load-carrying member.

It may also be noted that the body of elastic material is cut-off or shortened at its upper end so that it extends substantially horizontally into the rabbet formed at the upper end of the member 14. This shape of the rubber body at that point tends to eliminate a crease or fold that would otherwise form in the rubber when the mount is placed under load.

It will be noted that the load-carrying member 14 is displaced upwardly with respect to the outer supporting shell 10 in that the top and bottom of the member 14 are considerably higher than the top and bottom respectively of the member 10. This upward displacement of the member 14 provides for the upward inclination of the inner and outer surfaces 12 and 19 of the body of elastic material, the upward sloping of the lower surface being important to bring about the proper functioning of the mount.

In the testing of a mount constructed according to the present invention, it will be found that when the mount is placed under various loads and a load deflection curve is plotted, the curve will be substantially linear for loads up to a certain amount, that is the deflection will be substantially proportional to the amount of the applied load. When, however, the applied load is above a given figure, it has been found that the deflection increases much more rapidly, resulting in a flattening out of the load deflection curve as is described.

While we have shown and described a preferred embodiment of our invention, it will be understood that it is not to be limited to all of the details shown, but is capable of modification and variation within the spirit of the invention and within the scope of the claims.

What we claim is:

1. A shock-absorbing mounting comprising an outer hollow member, an inner member having its outer surface in spaced relation to the outer member and partly embraced therewithin, a body of resilient material between said members and bonded to both thereof, the lower surface of said body being inclined upwardly and inwardly in substantially cone-frustum form terminating in a web portion forming the top of the lower surface, and the upper surface of the body being inclined upwardly and inwardly at a steeper angle than the lower surface to give the body a greater axial dimension adjacent said inner member than adjacent the outer member, said outer member being unobstructed at both ends thereof to permit the body of resilient material to be forced through the lower open end of said member under load, the lower portion of said inner member being of substantial spherical shape lying above said outer member when said inner member is not under load, and being supported from below by the said web portion of the resilient material, the lower spherical portion of said inner member being rabbeted at the top to provide a recess to receive a portion of the resilient material.

2. The shock-absorbing mounting set forth in claim 1 wherein the upper and lower portions of said inner member are separably connected in threaded engagement.

References Cited in the file of this patent

UNITED STATES PATENTS

| 2,246,833 | Beemer | June 24, 1941 |

FOREIGN PATENTS

| 260,025 | Switzerland | July 1, 1949 |
| 435,023 | Great Britain | Sept. 6, 1935 |
| 581,803 | Great Britain | Oct. 25, 1946 |
| 621,441 | Great Britain | Apr. 8, 1949 |
| 621,693 | Great Britain | Apr. 14, 1949 |
| 786,893 | France | June 24, 1935 |
| 887,567 | France | Aug. 16, 1943 |